July 11, 1933. E. W. DIECKMANN 1,917,638
ELECTRIC PLUG APERTURE INDICATOR
Filed March 12, 1931
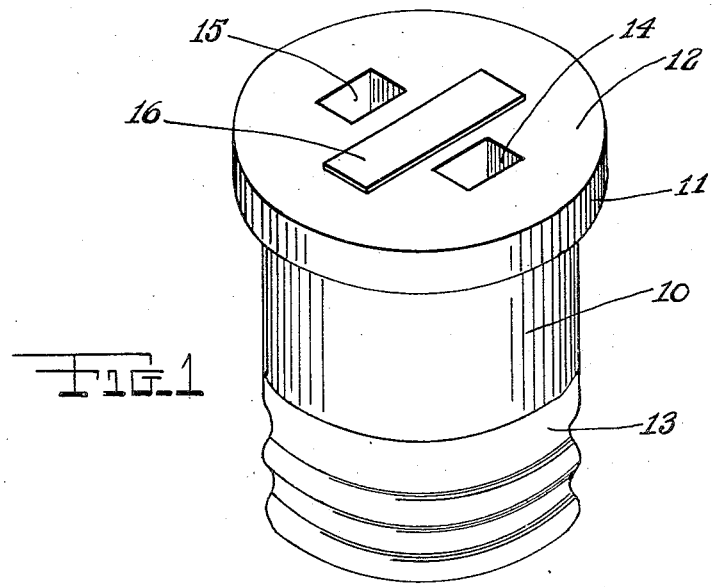
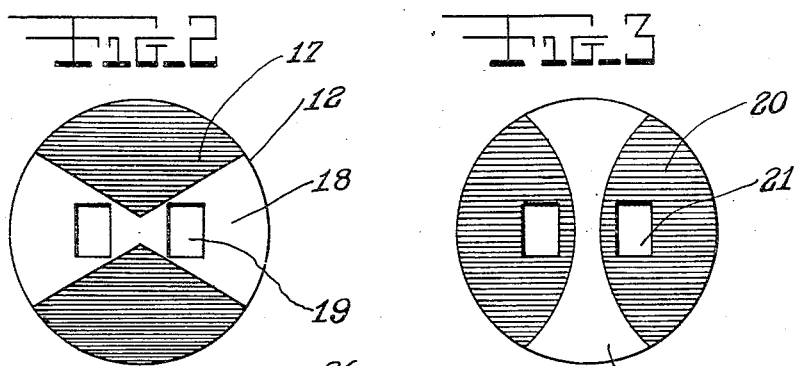
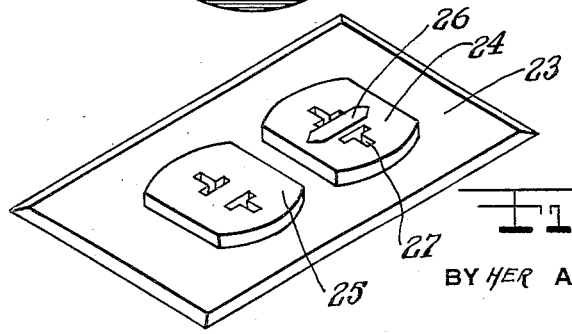
INVENTOR
E. W. Dieckmann
BY HER ATTORNEY J. Ledermann Patented July 11, 1933

1,917,638

UNITED STATES PATENT OFFICE

EDNA W. DIECKMANN, OF ORANGE, NEW JERSEY

ELECTRIC PLUG APERTURE INDICATOR

Application filed March 12, 1931. Serial No. 521,899.

The main object of this invention is to provide a socket in which the apertures or openings for complemental plugs may be readily found. It should be noted that these sockets with apertures therein for the terminal studs of plugs are now in universal use, and are screwed into an outlet in a baseboard or wall for convenience. In a subdued light or in the darkness it is very often an exceedingly difficult matter to align the terminal studs of a plug with the apertures in the socket to attain the necessary electrical connection. This invention has for its primary purpose to provide means for indicating the angle or location of the aperture so that the terminal studs of a plug may be quickly and readily matched so that the necessary connection may be made. The indicator provided on a socket of this type is equipped with iridescent surfaces so that the location of the apertures in the socket may be readily visualized in any degree of light or illumination or even within a reasonably dark chamber or dwelling.

The above and other objects will become apparent in the description below in which characters of reference refer to like-named parts in the drawing.

Referring briefly to the dawing, Figure 1 is a perspective view of an electrical socket showing the receiver apertures and the means of indicating the position of these apertures mounted upon the face of the socket.

Figure 2 is a top plan view of a modified type socket showing the geometrical division of the face of the socket to indicate the position of the apertures therein.

Figure 4 is a perspective view of a popular type of outlet fixture showing my indicating strip mounted in place thereon.

Figure 3 is a view similar to Figure 2 with a different type of geometrical division of the face of the socket to indicate the position of the apertures thereon.

Referring in detail to the drawing, the numeral 10 indicates the body of a universally used type of screw socket which is adapted to be received in an outlet of an electrical head 11 upon which a flat face 12 is formed. The lower end of the body is provided with the usual type of screw sleeve 13 which forms one of the terminals of this socket member. In the usual type of socket a pair of elongated, rectangular apertures 14 and 15 are formed. These apertures are adapted to receive the entering terminal studs of an electrical plug not shown on the drawing. The face 12 of the flange 11 has a strip of material mounted between the apertures 14 and 15 in a direction preferably at right angles to these apertures as indicated by 16. This strip of material if preferably formed of some iridescent substance, and may be a layer of paper, mother-of-pearl, or any other suitable material which is of a contrasting color, and may be coated with a radiant pigment so as to obtain iridescence in order to be visible in a subdued light or darkness.

In the modified form of device shown in Figure 2 the field of the socket is geometrically divided into four irregular quadrants, two of which are joined to each other. The quadrants 17 are preferably colored with dark material while the convergent, triangular joined segments 18 have their surfaces coated with some suitable iridescent material such as previously mentioned. In these quadrants 18 are aligned apertures 19 which receive the terminal studs of a plug socket.

In the modification shown in Figure 3 the field or face of the socket is colored with some dark pigment as indicated by the numeral 20 and in these dark areas the apertures 21 of the socket are located.

Between these apertures the diametral area 22 coated with an iridescent material is provided. This area at its extremity is flared outwardly to present a field large enough to be visible from an appreciable distance by the user of the plug.

The plug illustrated in various modifications on the accompanying drawing is adapted to indicate the position of the apertures forming part of the plug no matter what angle these apertures find themselves in in a particular outlet. By providing an illuminated or contrasted surface between the aperan indication of the approximate positions of the apertures is had to the user of the plug.

I propose to provide a strip of material having light reflecting purposes such as radium, mother-of-pearl or similar other suitable materials. By placing this strip of material of a contrasting color on the socket between the apertures as indicated by the numerals 16 and 22 or aligned with the apertures as indicated by the numeral 18 in Figure 2.

The indicator is provided for definitely showing the approximate position of the aperture so that the user of the socket need not be required to probe for these apertures.

In the modification shown in Figure 4 a view of a popular type of outlet box is shown. This outlet box comprises the guard plate 23 from which two outlet members 24 and 25 project. These outlet members are similarly provided with a strip of iridescent material 26 for the purpose of indicating the approximate positions of the openings or plug apertures 27 of the outlet, suitable for use with base plugs or receptacles whereby an attachment of any type may be plugged in.

It is to be noted that certain changes in form and construction may be made without departing from the spirit and scope of the invention.

I claim:

In a socket having a face and terminal apertures therein, a rectangular strip of self-luminous material affixed on and extending diametrically on said face between said apertures, the long sides of said strip lying adjacent and parallel to the long sides of said apertures.

In testimony whereof I affix my signature.

EDNA W. DIECKMANN.